US009888628B2

(12) United States Patent
Becker

(10) Patent No.: US 9,888,628 B2
(45) Date of Patent: *Feb. 13, 2018

(54) APPARATUS AND METHOD FOR HARVESTING PLANKTON AND OTHER BIOMASS FROM A DEAD ZONE

(71) Applicant: William R. Becker, Seattle, WA (US)

(72) Inventor: William R. Becker, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/447,839

(22) Filed: Mar. 2, 2017

(65) Prior Publication Data

US 2017/0238464 A1    Aug. 24, 2017

Related U.S. Application Data

(63) Continuation-in-part of application No. PCT/US2015/061822, filed on Nov. 20, 2015, which
(Continued)

(51) Int. Cl.
*A01D 44/00* (2006.01)
*A01K 73/02* (2006.01)
(Continued)

(52) U.S. Cl.
CPC .......... *A01D 44/00* (2013.01); *C02F 1/00* (2013.01); *C02F 2103/007* (2013.01)

(58) Field of Classification Search
CPC ...... A01K 61/007; A01K 79/00; A01K 75/00; A01K 80/00; A01D 44/00; C02F 2103/007; C12M 23/56; C12M 33/00
(Continued)

(56) References Cited

U.S. PATENT DOCUMENTS 4,084,543 A    4/1978 Pequegnat
4,257,350 A *  3/1981 Streichenberger ..... A01K 61/60
                                                    119/223
(Continued)

FOREIGN PATENT DOCUMENTS

CN    201447694 U    5/2010
CN    201701801 U    1/2011
CN    202 538 453 U  11/2012

OTHER PUBLICATIONS

International Search Report for International Application No. PCT/US2015/061822.

*Primary Examiner* — Claire A Norris
(74) *Attorney, Agent, or Firm* — Katten Munchin Rosenman LLP

(57) ABSTRACT

Apparatus and method for harvesting biomass from a dead zone in a body of water includes structure and/or function whereby, preferably, at least one guide float is configured to float below the water surface. At least one support structure is configured to be coupled to the bottom beneath water, and is configured to support a substantially rigid frame within the dead zone. A main funnel is coupled to (i) the at least one guide float and (ii) the substantially rigid frame within the dead zone, and is configured to collect descending biomass and funnel it toward a lower funnel that is coupled to the bottom of the main funnel. A collection canister is disposed adjacent the lower funnel and is configured to store the descending biomass. Hauling structure is coupled to the guide float and is configured to haul the collection canister from the lower funnel to the surface.

20 Claims, 12 Drawing Sheets

Related U.S. Application Data is a continuation of application No. 14/551,561, filed on Nov. 24, 2014, now Pat. No. 9,155,248.

(51) Int. Cl.
*A01D 21/00* (2006.01)
*C02F 1/00* (2006.01)
*C02F 103/00* (2006.01)

(58) Field of Classification Search
USPC .. 210/776, 767, 800, 170.06, 170.09, 170.1, 210/170.11, 424.1, 388; 47/1.4; 56/8
See application file for complete search history.

(56) References Cited

U.S. PATENT DOCUMENTS

| | | |
|---|---|---|
| 4,646,577 A | 3/1987 | Phillips |
| 7,445,719 B2 | 11/2008 | Lundback et al. |
| 2009/0137025 A1 | 5/2009 | Stephens et al. |

\* cited by examiner

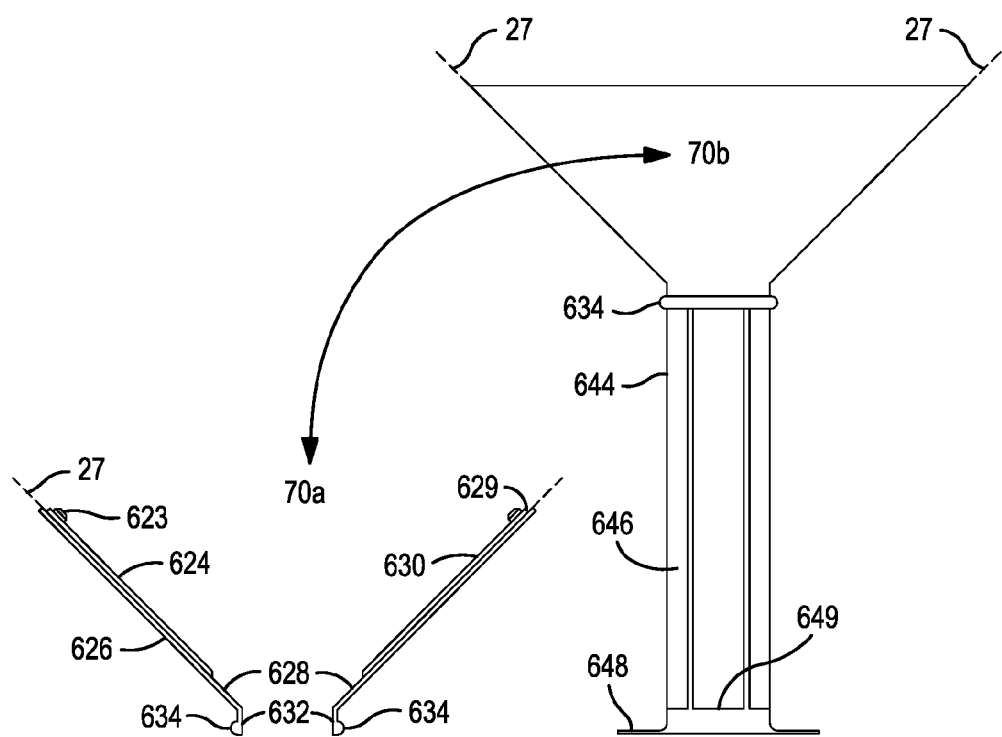
FIG. 7a  FIG. 7b

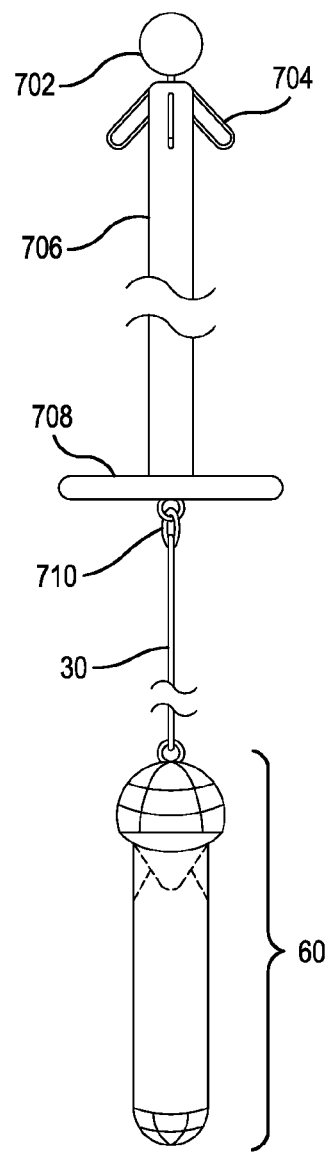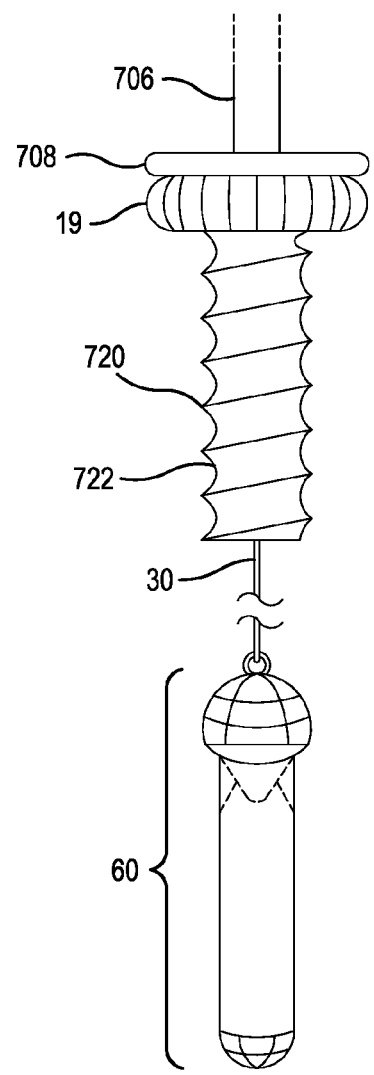
FIG. 10a  FIG. 10b

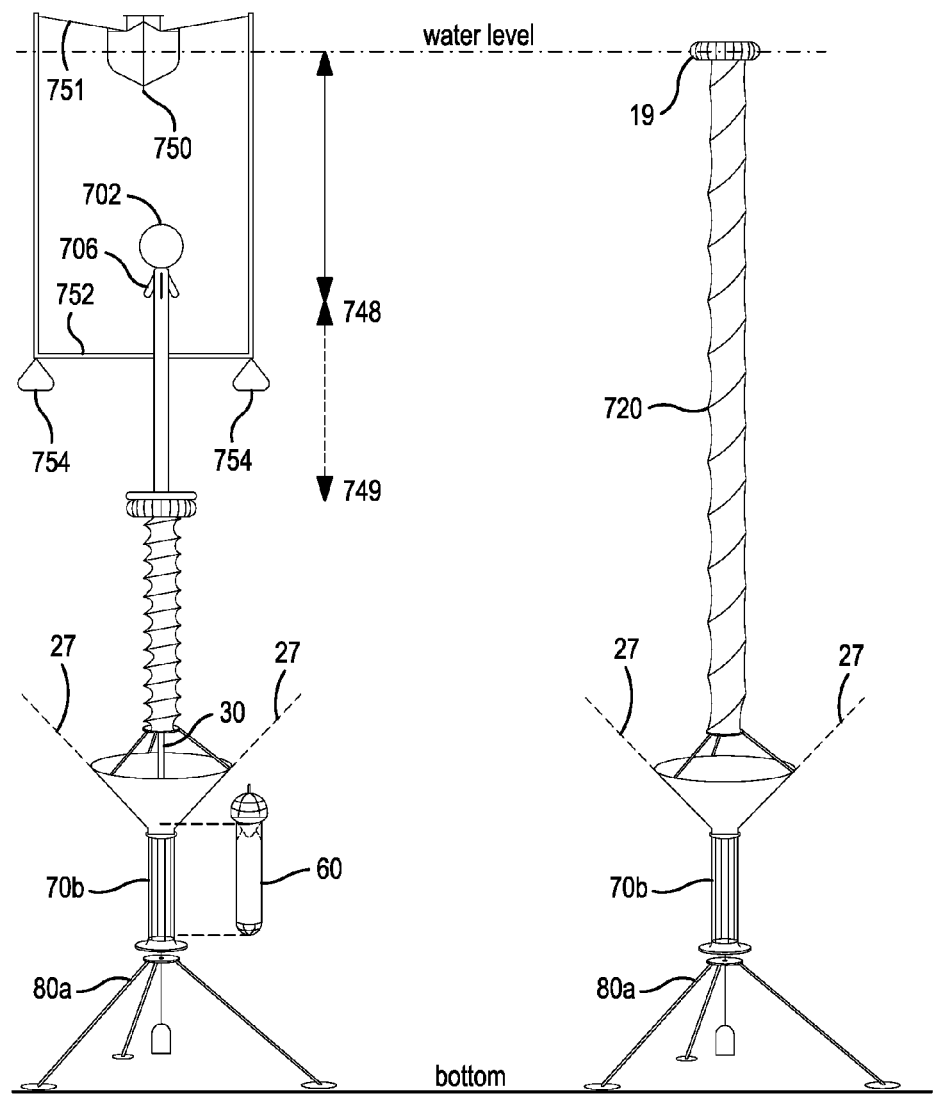
FIG. 11a  FIG. 11b

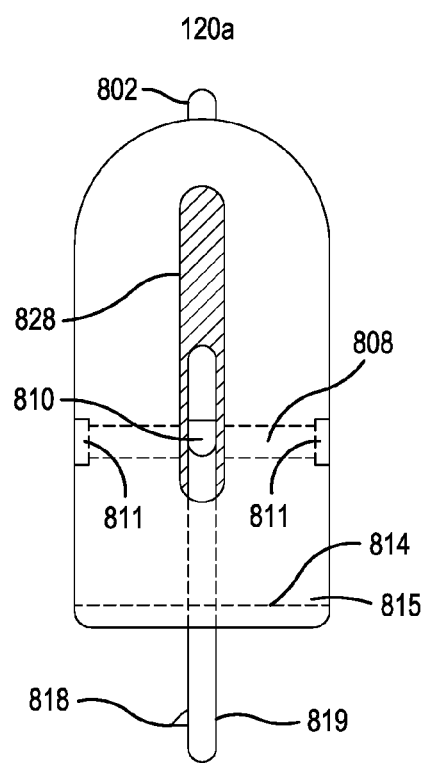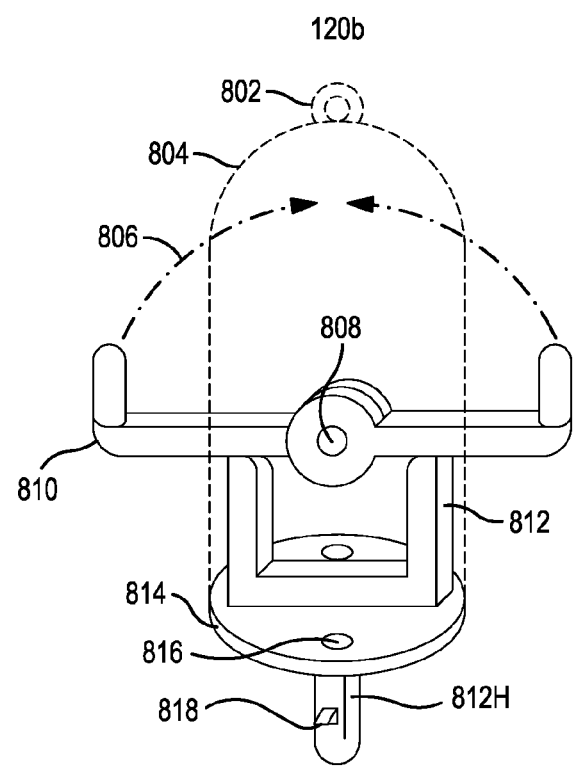
FIG. 12a  FIG. 12b

APPARATUS AND METHOD FOR HARVESTING PLANKTON AND OTHER BIOMASS FROM A DEAD ZONE

This is a Continuation-In-Part of PCT/US15/61822, filed Nov. 20, 2015 (designating the US), which is a continuation of U.S. application Ser. No. 14/551,561, filed Nov. 24, 2014, now U.S. Pat. No. 9,155,248, issued Oct. 13, 2015.

BACKGROUND

Technical Field

The present invention relates to system, method and apparatus for harvesting plankton and other biomass, preferably from dead zones in lakes and oceans. Such harvesting of biomass leads to reductions in dissolved and atmospheric $CO_2$ and $CH_4$, ocean acidity and acid rain.

Overview

A 2008 study ("Spreading Dead Zones and Consequences for Marine Ecosystems", Diaz, Robert J. and Rosenberg, Rutgers, Science 15 Aug. 2008: Vol. 321 no. 5891 pp. 926-929, DOI: 10.1126/science.1156401) counted 405 seasonal dead zones encompassing more than 97,000 square miles in coastal waters worldwide. By 2014 there were over 550 dead zones. The plankton in these dead zones contain billions of tons of carbon. Most plankton are destined to release their carbon as $CO_2$ and/or $CH_4$ when they die. The aim of this invention is to interrupt the carbon cycle in about half of each dead zone and sequester its carbon. Some can be sequestered directly, some indirectly by processing the biomass into methane and fertilizer to replace fossil fuels and chemical fertilizers. See also "A Look Back at the U.S. Department of Energy's Aquatic Species Program: Biodiesel from Algae: Close-Out Report", NREL/TP-580-24190, John Sheehan, et al., July 1998. They found that microalgae can "achieve very efficient (>90%) utilization of $CO_2$", considerably better than terrestrial plants.

Harvesting and processing a billion tons of biomass might take a million qualified boats and 10 million workers. For this to work it should be profitable: the value of the end products should exceed the cost of harvesting, processing, transport, etc. Most of the harvesting is passive, taking advantage of the shortened life cycle of microalgae in a dead zone, and using gravity and wave motion to speed the capture. The energy required for harvesting is minimal, and the energy for processing and transport need not be from fossil fuel; it can be replaced by methane ($CH_4$) produced from the biomass itself. Profits can be used to acquire deforested land and re-plant native trees, fertilized with harvested biomass. These trees will sequester $CO_2$ for centuries. The following concepts are helpful to understand and to responsibly use this invention.

1. The Aquatic Carbon Cycle.

In a healthy aquatic ecosystem phytoplankton (microalgae) absorb dissolved $CO_2$ and emit $O_2$ by photosynthesis. They are the base of the food chain for aquatic animals and microbes that reverse the carbon exchange by absorbing $O_2$ and emitting $CO_2$. A small fraction of the carbon remains at the bottom, as evidenced by the abundance of coral reefs, carbonate rock, fossil fuels and methane ice.

2. The Diurnal Cycle of Microalgae.

In the photic zone, where there is enough daylight for photosynthesis, microalgae metabolize dissolved $CO_2$ into glucose and other carbohydrates. These are heavier than sea water allowing the algae to drift downward to escape predation and to where minerals are more concentrated. Like all plants, microalgae need some $O_2$ at night to process nutrients. They get this $O_2$ from the water and from what they internally stored. Leftover carbohydrates are stored as high energy lipids (bio-oils). These lipids are lighter than water and allow the microalgae to drift back up in time for daylight. Blue green algae produce an internal gas to allow them to rise. Before reaching the surface the specific gravity of microalgae is indistinguishable from that of the surrounding water. Then the cycle of descent and rise begins again.

3. Algal Blooms.

Algal blooms in lakes and oceans are caused by an excess of vital nutrients, without which microalgae cannot exist. They include salts of nitrogen, potassium, phosphorous and other trace minerals. Crucial among the vital nutrients are $CO_2$ and, of course, $H_2O$. Carbohydrates including glucose and cellulose are made exclusively from C, H and O. Carbon constitutes 40% of these compounds. Excessive dissolved $CO_2$ was once so rare that large algal blooms were seldom seen. An excess of nutrients can come from natural events such as forest fires and floods washing topsoil into waterways, but more often from man-made sources such as:

Farming practices. During rainy seasons, eroded soil, soluble fertilizers, cattle, pig, and poultry farm runoff may reach rivers and flow into lakes and oceans.

Burning fossil fuels. This raises dissolved $CO_2$ levels in lakes and oceans. Dissolved $CO_2$ forms carbonic acid that dissolves coral reefs, shells, carbonate rock, eggs, etc. The released calcium is also a vital nutrient for some microalgae.

Acidification. Sulfuric acid rain also dissolves minerals. It is formed as a noxious byproduct from burning coal and making coke for steel mills.

4. Methane and Methane Ice.

Methane, the main ingredient of natural gas, has the chemical formula $CH_4$. If burned with enough $O_2$ it produces $CO_2$ and water vapor, both greenhouse gases. But unburned methane in the atmosphere is a much more potent greenhouse gas than $CO_2$. It is reported that molecule for molecule the $CH_4$ radiative value is 72 times that of $CO_2$. Therefore systemic leakage of methane should be prevented.

In deep water where the pressure is great enough and/or the water is cold enough, methane gets into the crystalline structure of water and forms methane hydrate, otherwise known as methane ice. Pressure-temperature tables for the formation of methane ice are available. According to the Lawrence Livermore National Labs, " . . . the energy locked up in [underwater] methane hydrate deposits is more than twice the global reserves of all conventional gas, oil, and coal deposits combined." Fortunately for life on earth, methane ice is heavier than water.

5. Dead Zones.

In the 1970's large algal blooms started appearing around the mouths of certain rivers during warm months. They are called "dead zones" if the deeper waters have too little dissolved oxygen (hypoxia), or no dissolved oxygen (anoxia). Few living things can survive under these conditions. In 2002 the dead zone in the Gulf of Mexico alone covered 8,500 square miles.

6. Causes of Dead Zones.

Lakes and oceans tend to be stratified by the weight of the water. Highly oxygenated surface water mixes only slightly with the heavier, colder and more saline bottom water. Surface currents range from 0 to 5.6 mph, but it barely helps mixing because these speeds reduce exponentially with depth. It is especially true in a dead zone where there are neither schools of fish, nor filter feeders to stir things up. As phytoplankton, dead zooplankton, zooplankton excreta and other biomass fall to the bottom, aerobic bacteria metabolize it, and in doing so deplete the dissolved $O_2$. If the region becomes anoxic, Methanogenic Archaeons take over. The domain Archaea, discovered in 1977, contains the first life forms on earth some 3.6 billion years ago. They cannot function in oxygen but thrive in swamps, manure piles and the anaerobic colons of animals including zooplankton. They emit neither $O_2$ nor $CO_2$, but methane ($CH_4$) and often hydrogen sulfide ($H_2S$). In water $H_2S$ forms hydrosulfuric acid that raises water acidity. In high enough concentrations both of these emissions kill plants and animals and spread hypoxia upward.

Algal blooms cloud the water, limiting the depth of the photic zone. Algae have evolved to descend a certain distance during their night cycle before they drift back upwards. To do this they should have enough $O_2$ to produce lipids or gases, without which they continue to sink to the bottom and worsen hypoxia. Dead zones have very little ecology, but they have some. For example there are reports of a microbe that can metabolize $CH_4$, probably emitting $CO_2$ and $2H_2O$. Whatever these microbes are, they should be thriving in dead zones. Any un-metabolized $CH_4$ may evaporate into the atmosphere and accelerate climate change.

7. Uses for Harvested Biomass.

Most chemical fertilizers consist of ammonium nitrate, phosphate and potash (N—P—K). Over time crops grown with only N—P—K fertilizers leach other needed micronutrients out of the soil. The process of making ammonium nitrate consumes 1% to 2% of the world's annual energy supply (see "The Haber Process" at http://en.wikipedia.org/wiki/Haber_process). It is therefore a major contributor to climate change. Phosphates and potash are mined adding to the energy budget, and phosphates are increasingly expensive. On the other hand fresh water biomass can be processed into fertilizer and $CH_4$ simply by composting it in an anaerobic digester. Digesters are commercially available and are used in communities and farms to profit from these products. (Oceanic biomass should be desalinated before it can be used as fertilizer).

Since aquatic biomass stems from phytoplankton, it contains all the nutrients needed to grow plants. These "marine derived nutrients" or MDNs build topsoil. Researchers at the University of Washington have shown that Sitka spruce grow over three times faster in watersheds fertilized by migratory salmon (via bears, eagles, otters, and whatever else eats dying salmon) than in watersheds without salmon. Everything that is in the MDN, salmon, had to be also in microalgae, the base of the marine food chain. Pyrolysis can be used to sequester carbon directly, as well as producing methane and other flammable gases. It involves heating biomass in an airtight container. Solar concentrators are the logical choice of heat source. A film that reflects sunlight with 95% efficiency has been developed with help from the National Reusable Energy Laboratories (NREL). Biomass is transformed into char, bio-oil, methane, syngas and ash. The relative amounts of each substance depend on the temperature of the pyrolysis. The ash contains minerals that could be used as fertilizer, if it were desalinated. The char (carbon) can be compressed with a non-flammable binder into blocks and sequestered, perhaps in abandoned coal mines. By comparing the atomic weights of C=12 and $CO_2$=44 one sees that for every ton of char (C) sequestered, 11/3 tons of $CO_2$ are kept out of the atmosphere. Thus algae take dissolved $CO_2$ out of the water and pyrolysis keeps it out.

8. Where not to Harvest Biomass.

It is well established that plants can produce toxins to combat predation. Species of dinoflagellates sometimes produce neurotoxins "red tide" that concentrate in shellfish. Some blue-green algae can produce toxins such as microcystin that attacks the liver, and anatoxin-a that can kill a person and other animals within five minutes. Fortunately tests exist for such harmful algal blooms (HABS). Excess $CO_2$ causes an abundance of microalgae and that causes an abundance of predators and that may well cause microalgae to produce protective toxins. This growing problem is yet another reason to lower $CO_2$ levels. It is dangerous to harvest bottom sediment because disturbing it could release methane, hydrogen sulfide, heavy metals, PCBs and other toxins. It should not be harvested in waters cold and deep enough to form methane ice because once the biomass is metabolized by methanogens the emitted $CH_4$ is sequestered as methane ice. This sequesters carbon and reduces $CO_2$. In these regions the algal bloom tapers off partially from lack of CO2. It is unwise to harvest near the surface. It makes poor fertilizer as it generally lacks the trace minerals that are more concentrated at greater depths. Moreover separating such algae from water is difficult. Microalgae near the surface have a specific gravity indistinguishable from that of the surrounding water. Therefore it cannot be "spun-dried" in an ordinary centrifuge. A filtering centrifuge would use undue amounts of energy and the filter would quickly clog. Evaporation is possible but impractical. Algae harvested near the mouth of a polluted river may well contain persistent toxins, and should not be used.

9. Some Likely Outcomes.

Millions of people worldwide could be employed for months out of the year. MDNs could replace chemical fertilizers, un-mined "bio-methane" could become the standard fuel, oceans will be less acidic, atmospheric $CO_2$ will decrease, dead zones will eventually disappear, and using profits for reforestation will restore a more natural climate.

In alternative embodiments to be described below, surface devices and floats have been replaced with underwater devices, to avoid surface congestion and prevent surface collisions.

SUMMARY OF THE INVENTION

An underwater funnel trap is preferably assembled on shore and towed to the site on pontoons. Arrays of traps connected to one another are preferably seasonally deployed and removed at the end of the season. This can all be done from boats at the surface. A funnel trap passively directs falling plankton and other biomass into a canister within the funnel's neck. A float scale at the surface displays the dry weight of the biomass. (A cubic yard of dry biomass weighs over a ton). It is assumed that a crane or overhead winch will raise and lower the canisters during harvesting. Nevertheless, smaller boats may not be able to handle a canister weighing more than 1 ton. They might have to harvest the same funnels several times during their shift. Funnel traps are designed to withstand hurricanes, but an unattended canister can overflow with biomass and fill the funnel until it breaks or sinks the array. Therefore the design includes a "release float" (preferably with no moving parts) that releases any further biomass into the water.

The funnel trap preferably has a main funnel and a bottom funnel. All internal surfaces preferably have slick, non-stick surfaces. The main funnel is made of strong ultra-light film, such as Mylar™ or polypropylene. The mouth of the funnel is kept open by any suitable means, but in this preferred embodiment the rim is metal and heavier than water. A debris net attached to the rim keeps large objects from clogging the funnel. A funnel trap's mouth area of 10,000 ft$^2$ is expected to be standard for oceanic dead zones. Fresh water traps would be much smaller. The trap hangs in the hypoxic zone from 3 or more cables attached to floats. This depth prevents barnacles and insures that the plankton are heavy enough to "spin dry." The light should be too dim for large shadows to matter, but to be cautious the film should be clear or translucent. Wave action on the floats jiggle the sides of the main funnel and help the biomass slide into the canister. A conical bottom funnel is made of two nested metal funnels that sandwich the bottom of the film and provide needed weight. The removable canister resides in the neck of the bottom funnel.

When trying to cover some 50,000 square miles it is important to minimize materials. The use of ultra-light thin film is preferred, and the stress on it should be minimal. This is done in several ways. The angle that the cone makes with the horizontal depends on the ease of the biomass' slide. A slicker surface allows a smaller angle requiring less film. A wide mouth on the bottom funnel distributes the weight of the biomass over a greater area of film. A circular mouth on the main funnel uses the least rim material for a given area. Regular polygons (equilateral triangles, squares, etc.) use less rim material than irregular polygons do. Surprisingly, the area of the film depends only on the area of the main funnel's mouth and the angle of the funnel, whether the mouth be circular or a regular polygon.

A loaded canister on deck can be spun dried on its vertical axis to lighten its load. When the centrifuge reaches a certain RPM an aperture at the bottom of the canister starts opening. The biomass, being heavier than water, is pressed against the cylindrical wall while the water is allowed to drain out the bottom. When the water stops the aperture is closed and the motor is shut off. To keep the boat itself from spinning, canisters are preferably spun in pairs and in opposite directions. It is anticipated that large service ships or barges will swap empty canisters for loaded ones and bring them ashore for further processing.

According to a first aspect according to the present invention, apparatus for harvesting biomass (for example plankton, algae, phytoplankton, zooplankton, zooplankton excreta, cyanobacteria, and whatever else is small enough to get through the debris screen to be described below) includes at least one support float configured to float on a surface of a body of water. At least one support structure is coupled to the at least one support float and is configured to support a substantially rigid frame within a dead zone (for example, a hypoxic zone) below the surface in the body of water. A main funnel is coupled to the at least one support structure within the dead zone, and is configured to collect descending biomass and funnel it toward a lower funnel that is coupled to the bottom of the main funnel. A collection canister is coupled to the lower funnel, and is configured to store the descending biomass. A guide float is configured to float on the surface of the body of water, and a hauling structure is coupled to the guide float, and is configured to haul the collection canister from the lower funnel to the surface.

According to a second aspect according to the present invention, biomass harvesting apparatus includes a plurality of support floats configured to float on the surface of a body of water. A plurality of support lines is provided, each being coupled to a respective one of the plurality of floats and configured to extend downward from the surface into a hypoxic zone of the body of water. A rigid frame is coupled to the plurality of support lines, and a main funnel is coupled to the rigid frame and configured to catch descending algae. A lower funnel is coupled to a bottom of the main funnel, and is configured to guide the algae descending in the main funnel into a capture device.

According to a third aspect according to the present invention, a method of harvesting biomass includes the steps of: (i) deploying a plurality of support floats configured to float on the surface of a body of water; (ii) deploying a plurality of support lines each coupled to a respective one of the plurality of floats and extending downward from the surface into a hypoxic zone of the body of water; (iii) deploying a rigid frame coupled to the plurality of support lines; (iv) deploying a main funnel coupled to the rigid frame; (v) harvesting descending biomass with the main funnel; and (vi) guide the harvested descending biomass with a lower funnel coupled to a bottom of the main funnel.

According to a first aspect of alternative embodiments, biomass harvesting apparatus has at least one guide float configured to float below a surface of a body of water. At least one support structure is configured to be coupled to a bottom beneath the body of water, and is configured to support a substantially rigid frame within a dead zone below the surface in the body of water. A main funnel is coupled to (i) the at least one guide float and (ii) the substantially rigid frame within the dead zone, and is configured to collect descending biomass and funnel it toward a lower funnel that is coupled to the bottom of the main funnel. A collection canister is disposed adjacent the lower funnel and configured to store the descending biomass. A hauling structure is coupled to the guide float, and is configured to haul the collection canister from the lower funnel to the surface.

According to a second aspect of alternative embodiments, biomass harvesting apparatus has at least one guide float configured to float beneath the surface of a body of water. At least one vertical support is coupled beneath the at least one guide float and is configured to extend downward into a dead zone of the body of water. A rigid frame is coupled to the at least one vertical support in the dead zone. A main funnel is coupled to the rigid frame and is configured to catch descending biomass. A lower funnel is coupled to a bottom of the main funnel, and is configured to guide the biomass descending in the main funnel into a capture device. Bottom support structure is affixed to a bottom beneath the body of water and is configured to support the lower funnel.

According to a third aspect of alternative embodiments, a method of harvesting biomass includes deploying a guide float configured to float below the surface of a body of water. A support line is coupled below the guide float and extends downward into a dead zone of the body of water. A rigid frame is coupled to the support line, and a main funnel is coupled to the rigid frame. Biomass descending within the main funnel is thus collected. The descending biomass is guided into a collection device in a lower funnel coupled to a bottom of the main funnel. The collection device is hauled to the surface to harvest the biomass.

BRIEF DESCRIPTION OF THE DRAWINGS

FIG. 7a shows a side view of a type-2 bottom funnel, and FIG. 7b shows a cutaway of its neck.

FIGS. 10a and 10b show how a snagging mast attaches to a type-2 canister and how it holds down the underwater guide float.

FIGS. 11a and 11b depict the type-2 telescoping guide tube and the method to snag the mast in order to raise the canister.

FIGS. 12a and 12b depict a tool to help deploy and recover type-2 funnel traps.

DETAILED DESCRIPTION OF THE PRESENTLY PREFERRED EXEMPLARY EMBODIMENTS

Figure 1:
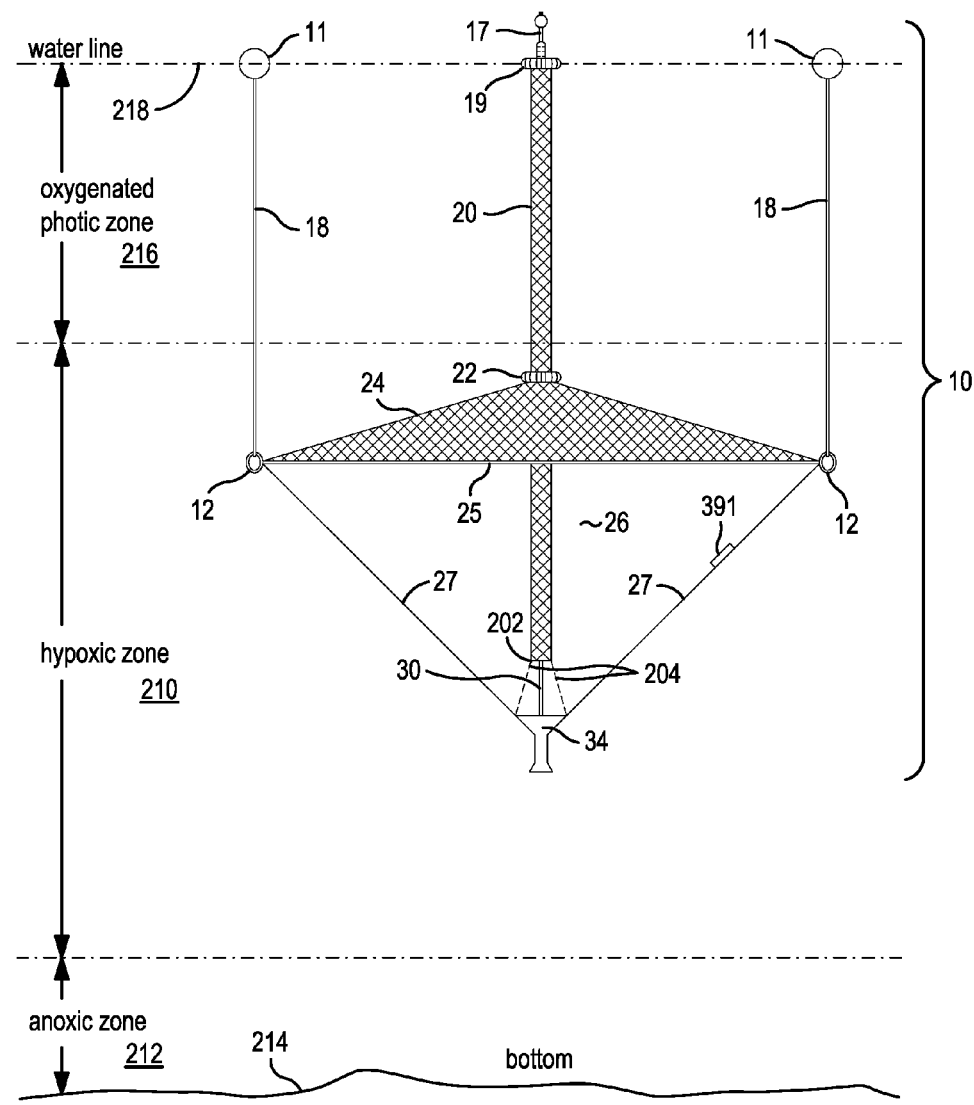
FIG. 1 is a schematic side view of a funnel trap suspended in a dead zone.

FIG. 1 is a schematic side view of a funnel trap 10 suspended in the hypoxic region 210 of a dead zone, above the anoxic zone 212 and the bottom 214, but below the photic zone 216 and the surface 218. In this preferred embodiment the top rim 25 that forms the mouth of a main funnel 26 should be heavier than water. If the mouth is circular, the top rim 25 could be a flexible metal rod or band bowed into a circle under tension. Preferably, three equal-length cables 18 are attached to three equally-spaced rings 12 along the top rim 25. Each cable 18 extends upward, respectively, to three floats 11 that carry the weight of rim 25, ultra-light film 27, and its contents. The funnel 26 preferably comprises a film 27, attached to the rim 25, and narrows conically downward to the bottom funnel 34, where the film is preferably sandwiched between two tightly nested metal cones 261 and 262 (FIG. 2), forming the mouth portion of the bottom funnel 34. The sandwiching of the film 27 between the nested metal cones 261 and 262 better distributes the weight of the biomass where it is most concentrated. Preferably, the floats 11 transmit wave motion to the top ring 25 via the cables 18, which helps the biomass slide into the bottom funnel 34. If the top rim 25 is a polygon, three or more cables 18 are attached equally-spaced to the polygonal rim 25. A horizontal cross section of film 27 preferably changes smoothly from a polygon into a circle to form the conical main funnel 26. Preferably, the buoyancy of floats 11 is such that they are pulled beneath the water in high waves, thereby relieving the tension on the film 27.

Figure 2:
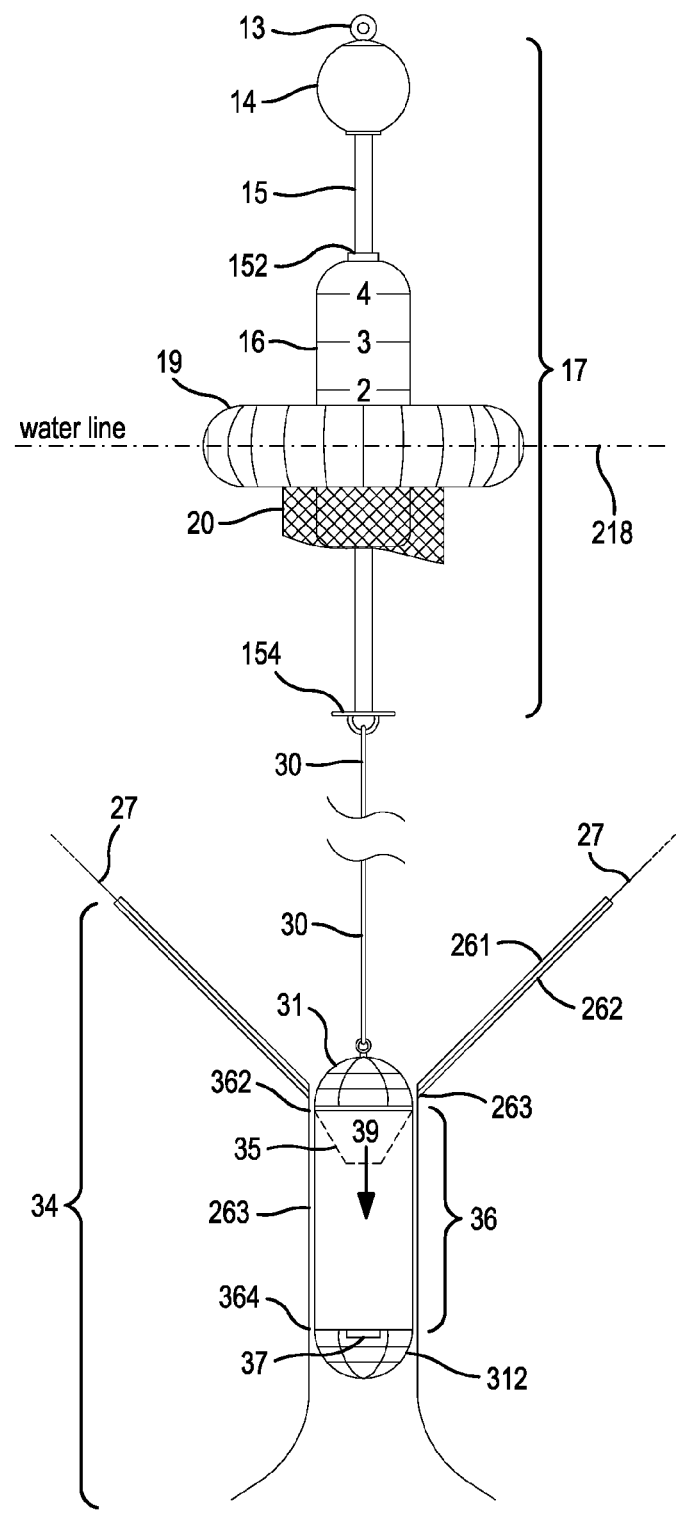
FIG. 2 shows a release float connected to a canister in the bottom funnel's neck.

Preferably, a guide float 19 is disposed at the surface 218 and is attached to a vertical guide tube 20 preferably made of nylon netting or other suitable material. The guide float 19 may have lettering or other identifier(s) for the harvesting boat that lowers and raises the canister 36 (FIG. 2). The guide float 19 and the guide tube 20 preferably guide the canister 36 into and out of the neck 263 of the bottom funnel 34, and hold the weight of the bottom funnel 34 with three chains 204. Chains are preferably used instead of lines when accurate distances are required, as their length is relatively constant when fully extended, and can hold the bottom funnel 34 substantially horizontal. Preferably, the bottom funnel 34 is supported by the guide float 19 only. A bottom ring 202 helps to keep the guide tube 20 straight. The chains 204 preferably begin at the guide float 19 and attach to the bottom ring 202, from where they extend downward to the mouth of the relatively heavy bottom funnel 34. When the chains 204 are fully extended, the film 27 is preferably mildly taut. The film's only load is preferably that of the sliding biomass 39, not the bottom funnel 34 or its contents, which are preferably supported by the chains 204. The chains 204 preferably do not, however, hold all of the weight of the canister 36 residing in the neck of the bottom funnel 34. The loaded canister may weigh several tons, and is preferably supported by a single line or chain 30 hung from a scale float 16 at the surface. That is, the self-contained scale float 16 and the canister 36 are preferably free floating and separate from the rest of the funnel structure (except for the O-rings 362 and 364 to be described below).

Also preferably, a conical debris net 24, made of nylon or other suitable lightweight yet sturdy material, is affixed to the guide tube 20 at connector 22, sloping downward and outward to the top rim 25. The net 24 preferably keeps the bottom funnel 34 from being clogged with debris, and its slope helps to shake off the debris.

FIG. 2 shows the guide float 19, a release float 17, and a canister apparatus 36 in greater detail. The release float 17 is preferably attached to a hauling chain 30 that holds the canister 36. The canister apparatus resides in the funnel trap, but is not attached to it. It is free floating and preferably adds little or no weight to the trap. The guide float 19 and its attached chains 204 can easily handle the frictional forces that the canister apparatus imparts to the 263 neck of the bottom funnel 34. The proximity of the guide float 19 and the release float 17 minimizes the wave differential therebetween. That reduces wear on O-rings 362 and 364 by canister 36.

The release float 17 preferably has a rod 15, a hauling ring (or chain) 13, and a release stop float 14 on the top of rod 15 that keeps a released canister from sinking. An adjustable scale stop 152 is preferably used during initial deployment to adjust the length between itself and an empty canister within the neck of bottom funnel 34, as shown in FIG. 2. The float scale 16 is free to move along rod 15 between the float scale stop 152 and the stop washer 154, but in use it is pushed upward by water pressure against scale stop 152. The lower end of the rod 15 is preferably connected to a carefully measured chain 30. The adjustable scale float 16 is preferably scaled to measure the dry weight of the biomass in the canister 36. It also releases the canister when it is full, so that biomass will fall through the bottom funnel and not accumulate within the main funnel. The depth of the canister can be adjusted from the surface during the initial deployment. The numerals on the float scale can also be slid up or down and locked in place during initial employment.

The canister apparatus preferably includes an upper cage 31 that attaches the chain 30 to the canister 36, and allows the flow of biomass 39 therethrough, while filtering out larger objects and debris which may come through the guide float, thus avoiding the debris screen. The hemispherical shape of cage 31 helps canister 36 to be pulled smoothly upward from its released state below the bottom funnel 34. O-rings 362 and 364 keep the bottom funnel's neck relatively free of plankton. The O-rings can be made of soft substances such as silicone and/or lubricated felt, and/or hard substances such as carbon fiber and/or split bamboo. A baffle funnel 35 within the canister 36 keeps most plankton from drifting upward and out. One or more small holes (not shown) in the upper rim of the baffle funnel 35 vents trapped air and sometimes methane. After the canister 36 is hauled up, it is preferably placed upright in a centrifuge and "spun dried" around its vertical axis. As it reaches a certain RPM, an aperture 37 starts opening to release water. The lower cage 312 protects aperture 37 and helps lower fresh canisters into the bottom funnel. Preferably, the canisters 36 can be spun in pairs and in opposite directions.

Figure 3:
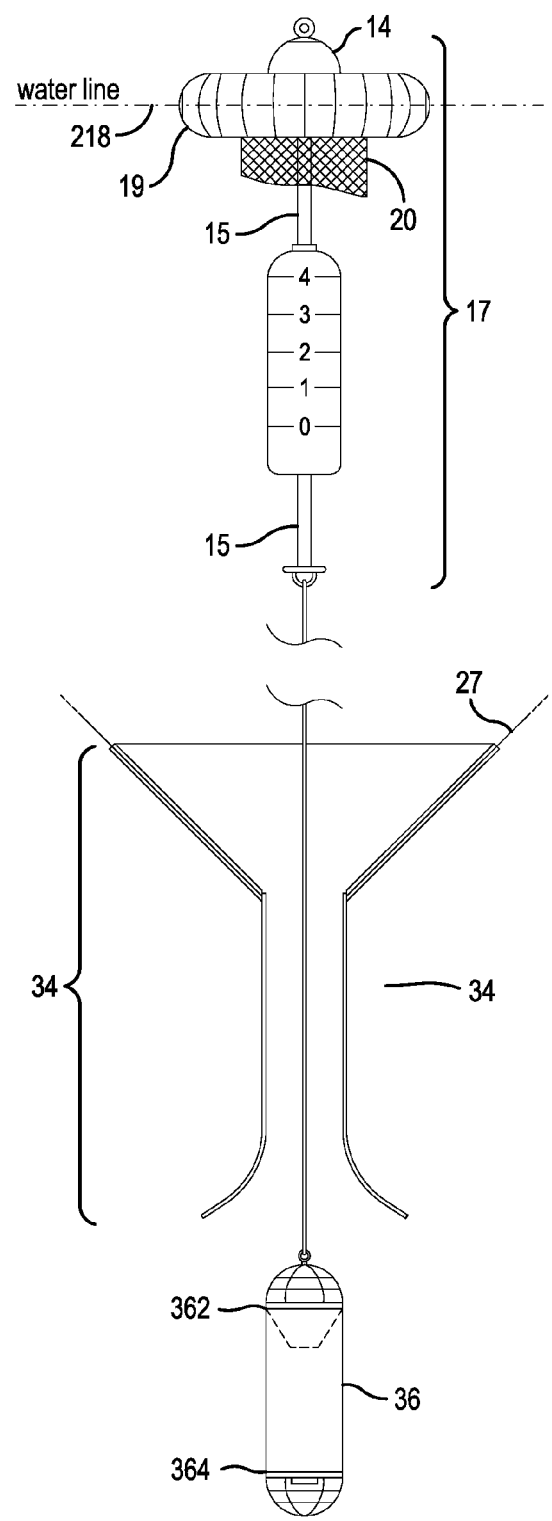
FIG. 3 shows an overweight canister that has been released from the funnel.

As biomass 39 displaces the water in the canister 36, the readings on float scale 16 effectively weigh the biomass minus the original weight of the water and the equipment—in other words, the dry weight of the biomass. The increasing weight lowers release float 17 attached to chain 30. By Archimedes' Principle, the upward force of release float 17 equals the weight of the water it displaces. The wider the release float's diameter the slower the canister descends as it fills. If a canister is ever allowed to fill to the point where the water level 218 reaches the upper rod 15, it preferably drops the canister 36 out of the bottom funnel 34, as shown in FIG. 3. At this point, the stop float 14 stops the canister 36 from falling any further. The released canister 36 could be capped to keep more weight out, but it is believed that slightly bobbing waves or a mild current is enough to shake off any excess accumulation of biomass. Preferably, the bottom funnel 34 is relatively heavy, so the friction of the canister's O-rings 362 and 364 will not let it get stuck when being raised.

It may happen that the guide float 19 is momentarily in the trough of a wave while one or more of the floats 11 are at the peak of the waves. Thus, large waves could put tremendous stress on film 27 and tear it. Therefore, the buoyancy of floats 11 are preferably pre-calibrated to be pulled underwater when under too much stress. Then, the film 27 becomes taut but not enough to cause damage. Thus, a lighter film can be used.

FIG. 3 shows the canister 36 in its released state. The canister has dropped far enough below bottom funnel 34 to avoid it accumulating significant further amounts biomass.

Figure 4A:
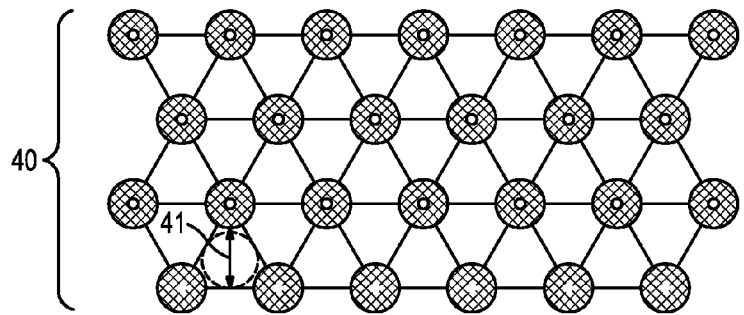
FIGS. 4*a*, 4*b*, and 4*c* are top views of three arrays of underwater funnel traps.
Figure 4B:
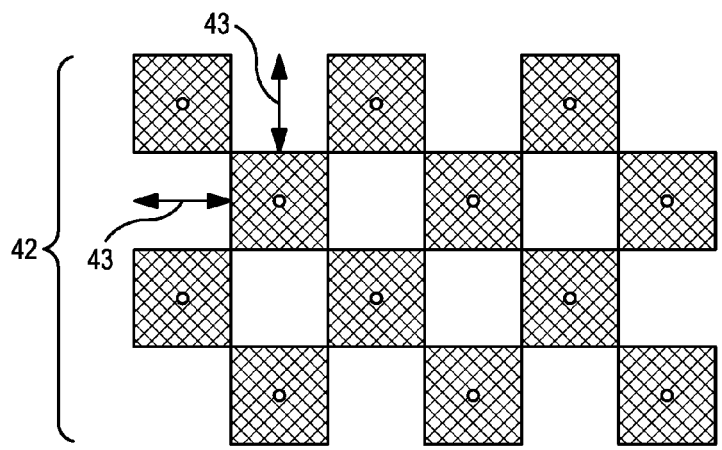
Figure 4C:
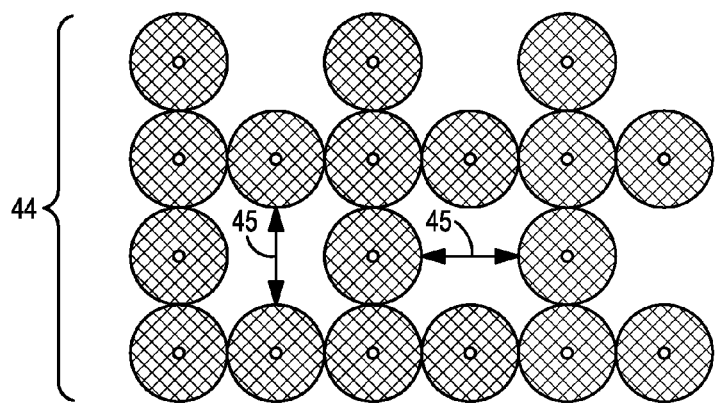

With an invention potentially covering a huge part of our planet, the cardinal rule is "First, do no harm." FIGS. 4a, 4b, and 4c addresses a potential ecological problem. Notice that these huge funnels and their connectors form a horizontal underwater net. If a migratory school of fish, marine mammals or another life forms happen to wander into the dead zone under the net, they may become disoriented and try to escape, perhaps in all directions. Dead zone floors are littered with carcasses. Some may be guided upward by the funnel toward the oxygen rich photic zone and escape, but some may be trapped under it because the space between funnels may be too small. Marine mammals don't breathe dissolved oxygen and, though their eyes might burn from the water acidity, they should know how to come up for air. If they happen to get lost under the array looking for an opening large enough, they may suffer cruel deaths. Endangered blue whales are said to grow 100 feet long or longer, no one knows for sure, and they should have a wide turning radius. Two simple rules preferably should be followed:

1. Connect polygonal mouthed funnels only at their corners, as in the checkerboard pattern of array 42 in FIG. 4b. If any were joined along adjacent sides, an animal swimming upward to where the sides join might not know which way to turn and die of asphyxiation.
2. In a body of water, each funnel should have a space around it that can accommodate the largest creature in that body of water. In an oceanic dead zone, distances 41, 43 and 45 in FIGS. 4a, 4b, and 4c should be a hundred feet or more. In fresh water they might be ten to thirty feet.

FIGS. 4a, 4b, and 4c are top views of three arrays designed for underwater funnel traps 10 held in place by one or more anchored buoys (not shown). The funnels are connected by their underwater top rims 25. Array 40 preferably includes round-mouth funnel traps connected by cables equal to the diameter of the funnels giving 25.3% coverage. Array 42 preferably comprises square mouth funnel traps in a checker board pattern giving 50% coverage. Array 44 preferably includes round mouth funnels with the horizontal and vertical openings between them the size if their diameters, giving 58.9% coverage.

Figure 5:
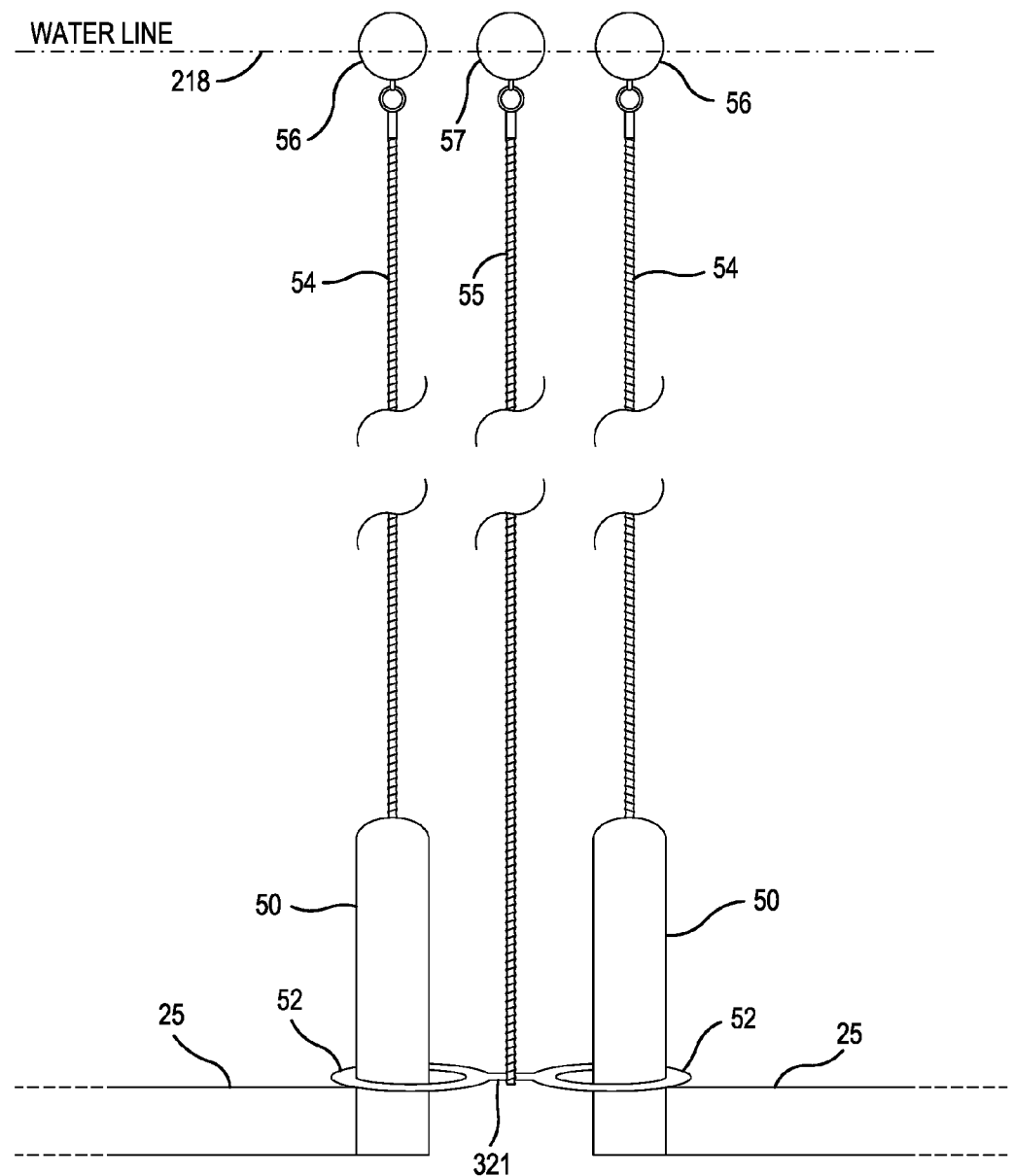
FIG. 5 shows how funnel traps in an array can be coupled and uncoupled from the surface.

FIG. 5 shows one way for boats at the surface to couple and uncouple funnel traps 10. It is preferred that each trap can move vertically in the waves independent of one another. Deploying traps and removing them are preferably done only at the start and end of a dead zone season. Preferably, two strong upright connector tubes 50 are rigidly attached to top rims 25 of adjoining funnel. Openable shackles 52 are preferably attached to each other with a rod or a chain 321. As depicted in FIG. 5, they fit loosely around connector tubes 50 and conjoin two or more funnel traps. Cords 54 emanating from within the connector tubes and are attached to floats 56 at the surface 218. Another cord 55, preferably tied to the rod (or chain) 321 conjoining shackles 52, is attached to float 57 at the surface 218. These cords are preferably left slack to reduce wear on the tubes 50 and the cords themselves. To decouple the funnel traps, the cord 55 is hauled up, the shackles 52 are opened, and they are removed from the cords 54. To couple the funnel traps again, bring them together by slowly pulling cords 54 from their floats 56, close the shackles around cords 54, and let them slide down onto the connector tubes.

It is conservatively expected that a funnel with a mouth area of 10,000 ft$^2$ will capture more than one dry ton of biomass/day. If a work boat harvests a canister every 20 minutes they will harvest over 24 tons/8-hour shift. It is also expected that the biomass will contain about 25% carbon, which can produce about 6 tons of methane and perhaps 18 tons of fertilizer/8-hour shift. Of course the boat may opt to run 3 shifts per day. The biomass should be desalinated if it is to be sold as fertilizer.

In alternative embodiments if FIGS. 6-12, so-called "type-2" funnel traps preferably have no floats on the surface, except when actively harvesting. Preferably, the main funnel 26 in FIG. 1 is unchanged except for the bottom funnel 34. Type-2 funnel traps are preferably not connected to one another. Instead, they are preferably anchored on heavy, self-leveling tripods at the bottom of the lake or ocean. Without surface floats, these embodiments do not use wave action to help slide the biomass down the main funnel into the canister, but another kind of "shake down" is provided below in the description of FIG. 9.

Figure 6:
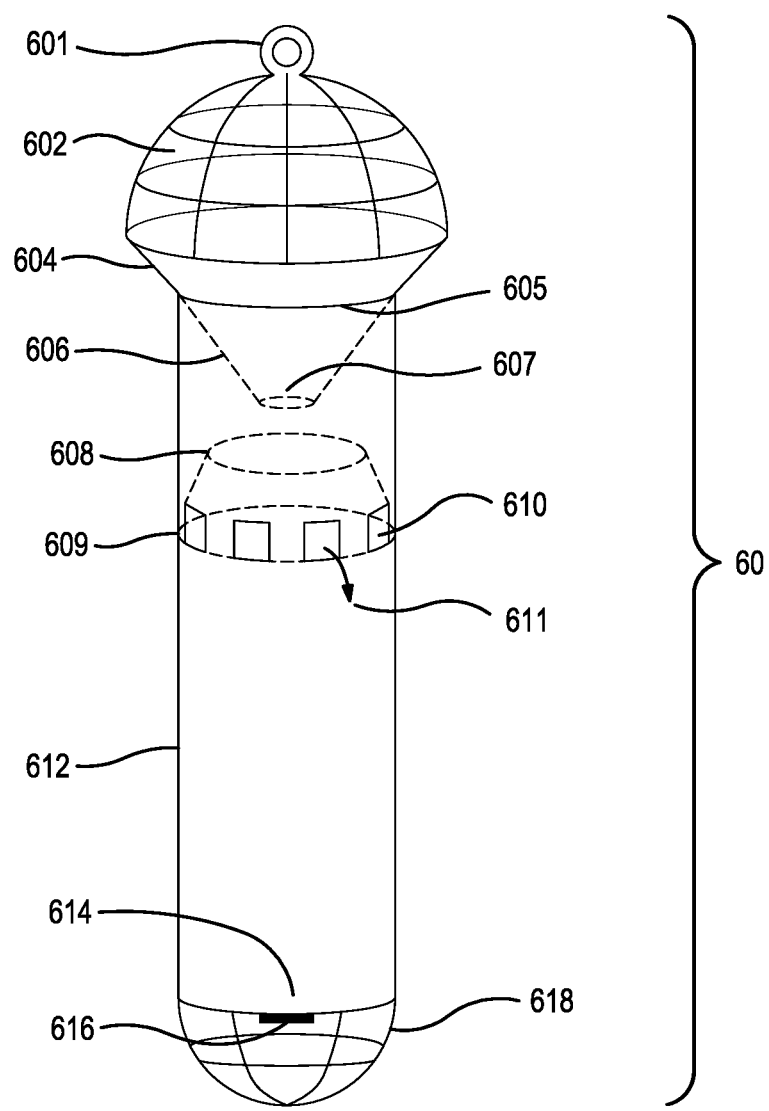
FIG. 6 shows a type-2 canister with its overflow.

FIG. 6 depicts a type-2 canister 60. Hauling ring 601 attaches line 30 (see FIG. 10) to an underwater guide float 19 above it. Line 30 is sufficiently strong to raise a canister full of biomass 60. Cage 602 allows the falling biomass to pass through into cylindrical tube 612. The streamlined shape of cage 602 allows it to be pulled through guide tube 720 smoothly without damaging the material. Cage 602 is affixed to the canister's strong upper rim 604, which, in turn, is attached to cylinder 612 and to internal baffle funnel 606 at join 605. Items 601-607 may be removed for maintenance preferably by unscrewing join 605. Join 605 should have one or more very small vent holes to release any air trapped between baffle funnel 606 and cylinder 612. A gasket (not shown) is affixed to the bottom of rim 604 to seal the conical seat 628 in bottom funnel 7a (in FIG. 7a). The diameter of the baffle funnel's vent 607 should be larger than the largest hole in the debris net to keep it from clogging. The biomass overflow release system is shown in 608-611. A truncated cone with open top 608 and an open bottom 609 that is attached to cylinder 612. There is no egress below open top 608, except through 608 itself. Since biomass is substantially heavier than water it will gradually displace the water and become compacted from the bottom of cylinder 612 upward. As it reaches the "full" level, 608, more and more dead plankton, etc., will escape to the outside of 608, fall through an escape hatch 610 and out of canister 60 as shown in 611. The simplicity of having no moving parts is worth more than the small amount biomass that may be lost during normal collection. Cylinder 612 is weighted at its bottom 614 for greater stability and speed of lowering when empty. Weighted bottom 614 can be removed via nut 616 along with cage 618 for emptying and cleaning.

FIG. 7a shows a cutaway of a bottom funnel, and FIG. 7b shows a side view of its open neck 646. Referring to FIG. 1 the bottom of the thin film 27 that forms the sides of the main funnel 26 is preferably sandwiched between two cones 624 and 626. That spreads and reduces the forces on thin film 27 as the canister gets heavier. Upper rims of 624 and 626 are preferably rounded 629 to keep them from cutting the film. Three or more equal-spaced hooks 623 are preferably used to hold down bottom ring 202 as shown in FIG. 1. The lowest conical area 628 just above cylindrical neck 632 preferably houses the upper rim 604 of the canister 60. The reinforcement ring/neck 634 is preferably used to attach rods 644 that make up bottom funnel's neck 70b, and to strengthen it enough to deploy when the dead zone begins and to remove when the dead zone ends (see FIG. 12). The open cage formed by rods 644 allows biomass overflow to escape the neck 70b. The deliberately heavy base 649 and flange 648 help to hold the main funnel rim 25 horizontal. Base 649 is filled with concrete and/or metal to keep the base stable.

Figure 8A:
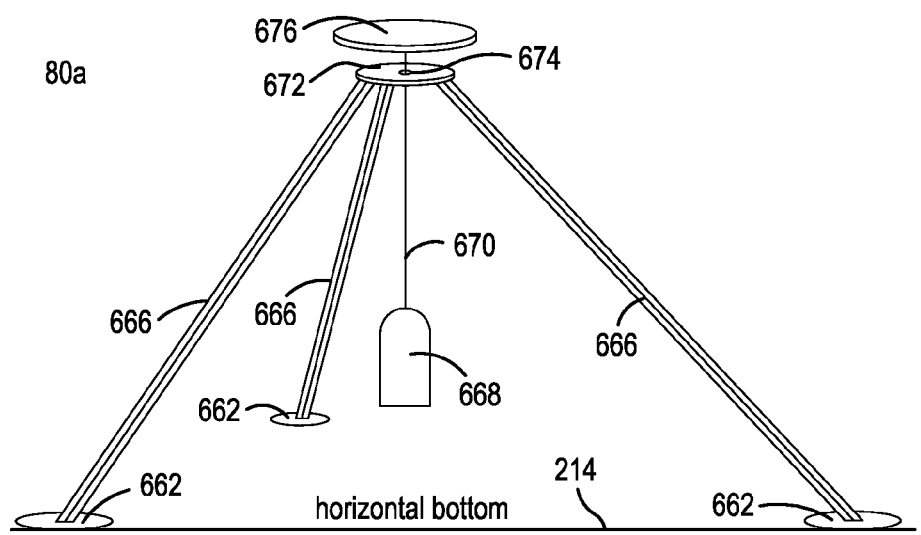
FIGS. 8a and 8b show a heavy tripod-anchor with a self-leveling upper plate.
Figure 8B:
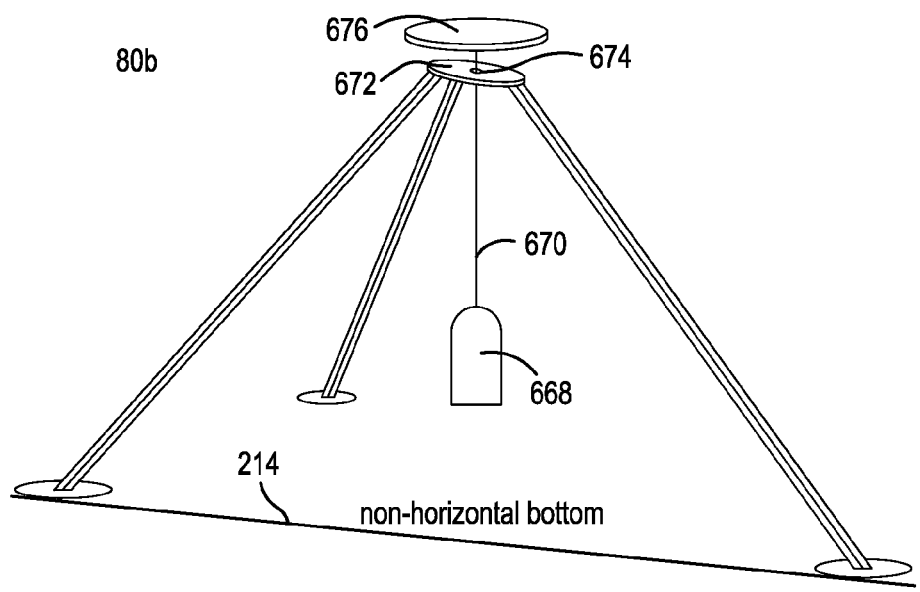

FIGS. 8a and 8b depict a tripod-anchor with a self-leveling upper plate. The main function of the tripod-anchor is to hold the funnel trap in place at the bottom so that the harvesting boat can locate their assigned traps, preferably with a GPS, and to deploy and recover the traps themselves. The feet 662 can be added, removed, or modified (e.g., with spikes) as appropriate for the bottom conditions. The legs 666 of the tripod 66 are strong, heavy rods attached to plate 672, which plate preferably houses a central ball joint 674. The leveling mechanism comprises a heavy weight 668 held by rod 670 that pierces the ball joint 674 and continues upward and is rigidly attached to plate 676. Notice that plate 676 is substantially horizontal despite irregular heights of the feet as shown in 80b. The flange 648 and/or the base 649 may be coupled to the plate 676.

Figure 9:
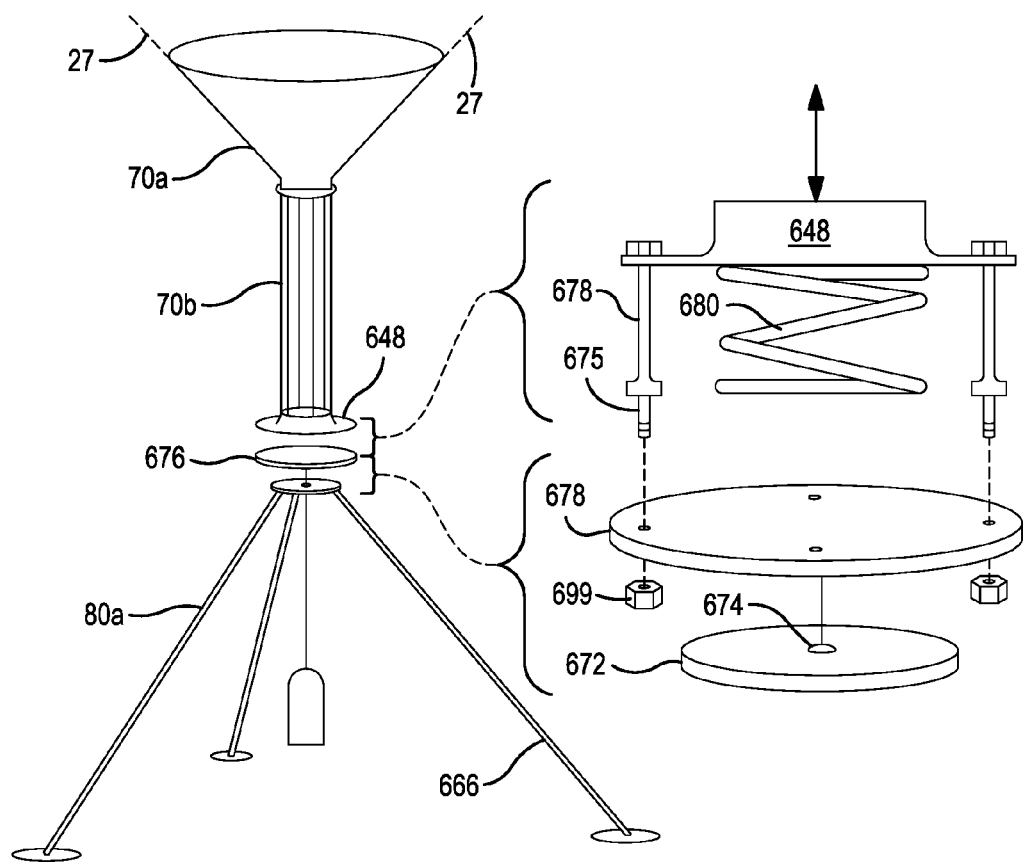
FIG. 9 shows a type-2 bottom funnel attached to the tripod with one or more springs.

In FIG. 9, the bottom funnel 70b is preferably attached to the tripod anchor 666. The bottom funnel's weighted flange 648 is preferably attached to and seated upon a biasing structure, e.g., compression spring 680, which is preferably mounted atop of and attached to plate a 676. The flange 648 and the plate 676 are preferably connected with two or more spacer bolts 678, as shown. Under enough force, the flange 648 can move downward as far as the compression spring 680 will allow, limited by the non-threaded portion 675 of the bolts 678 and the nuts 679.

With the arrangement of FIG. 9, a harvester (e.g., boat/ship) can periodically raise the canister 60 and then drop it back onto spring 680 to produce vibration/shock/force waves in film 27 that can help biomass 391 (FIG. 1) slide down the sides 27 of main funnel 26. Spacer bolts 678 also serve as a safety feature that keeps the bottom funnel 70b and tripod anchor 666 connected if the spring 680 breaks loose.

FIGS. 10a and 10b show a type-2 harvesting apparatus 100, including a snagging mast (702-710) preferably attached to an underwater guide float 19, a guide tube 720, and the canister 60. The weight of an empty canister 60 should be more than the net upward buoyancy of everything above it: i.e., the float 702, the snagging mast 706, the hold-down disk 708, and the guide float 19, so that the canister 60 is not pulled up until it needs to be. In this preferred embodiment, four carabiners 704 are preferably rigidly attached to a smooth light-weight mast 706. Since the funnel trap is preferably delivered in kit form, the mast 706 should be seamlessly joined together from shorter pieces. Any one of carabiners 704 should be able to hold a full canister 60. The hold-down disk 708 is preferably rigidly affixed to the bottom of the mast 706, with a line 30 extending from a connector 710 coupled to the bottom of the plate 708. Connectors 710 are preferably used to couple to the guide float 19. Line 30 preferably has a length that holds the guide float 19 down so that a float 702 is at a desired depth (perhaps 65' more or less) for capture by the harvester. When the canister 60 is being raised and the carabiner 710 reaches the surface, it is preferably removed from the bottom of the hold-down disk 708 and is re-attached to a line on the hauling winch that continues to raise canister 60 through the telescoping guide tube 720 and the guide float 19, both now at the surface. Guide tube 720 is preferably covered by a strong thin material 722 that stretches somewhat, e.g. nylon stocking material.

FIGS. 11a and 11b show a method to snag the mast 708, and to raise and lower the canister 60. One or more harvesting boats 750 pull a line attached to outrigger booms 751. Weights 754 form a U-shape in the line. The bottom of the U is a line 752 that should be between depths 748 and 749 (e.g., depth 748 may be from about 20 feet to about 200 feet; depth 749 may be from about 25 feet to about 225 feet). It is important that bottom line 752 should be above the guide float 19. As the boat 751 moves forward, the line 752 catches the mast 708 bending it forward and downward so that horizontal line 752 slides up the mast 708 and cannot escape and is trapped by snagging one or more of the carabiners 706. The harvesting boat 751 then hauls up the retrieval mechanism shown in FIG. 11a. The guide tube 720 is preferably made slack enough to stretch to the surface even during the highest tides and moderate waves. Harvesting should not be performed when storm waves are too high to have the line 752 to remain between depths 748 and 749. When the connection between the bottom of the mast 708 and the guide float 19 reaches the surface, the mast 708 is preferably unhooked and the harvesters preferably re-hook the upper end of the line 30 and haul up the canister 60. At this point, the guide float 19 preferably remains on the surface by its own buoyancy, stretching out the guide tube 720 to receive the same or another empty canister.

The above-described process may be reversed by re-attaching empty canister 60 to the bottom of the line 30 and lowering it into the guide tube 720 until the upper end of the line 30 reaches the guide float. Then, the carabiners 706 are re-attached to the mast 708 and guide float 19. The canister will then pull both of these down into place.

The best time to deploy a trap accurately is at slack tide on a calm day. One way to deploy the trap may be visualized in FIGS. 12a and 12b, which comprise a side view of a specialized tool 120a and an inside view 120b that helps to deploy a type-2 trap in a dead zone and remove it after the dead zone season is over. Referring to the funnel trap in FIG. 1 it is clear that the easiest way to lower and raise the funnel trap is to go through the guide float 19, the telescoping guide tube 720, and then into the bottom funnel 70b (FIG. 11b). Ring 802 is an attachment ring for a line to lower and raise a type-2 funnel trap. A smooth outer shell 804 allows the tool 120 to take that route without tearing the material 722.

Referring to FIG. 11*b*, when removing a type-2 funnel trap the canister should first be retrieved and guide float 19 will still be at the surface. Then with arms 810 outspread as shown in FIG. 12*b* lower tool 120 as far as it can go, which would be bottom 649 of bottom funnel 7*b*. When raising tool 120 the outspread arms will hook under reinforced ring 634 (FIG. 7) and the entire funnel trap can be lifted on deck where it can be disassembled. For deploying or moving, tool 120 is again hooked under reinforced ring, but after it is placed tool 120 is lowered until arms latch inside the shell. The smooth outer shell 804 has no sharp points or edges that could tear the material 722 in the guide tube 720. Affixed to the inside of shell 804 are opposing bushings 811 that hold the ends of an axle 808 so that the arms 810 are aligned with a two-pronged fork 812. If not thus-constrained, the arms 810 will fall open by gravity; but, when they are being lowered through the guide tube 720 or the bottom funnel neck 632, the arms 810 are easily pushed up along path 806. The arms 810 preferably have a rectangular cross section that is rounded wherever it can rub against anything outside of shell 804, to keep the guide tube material 722 unharmed. The open bottom 815 of the shell 804 is preferably rolled inward for the same reason.

Near the bottom of the shell 804 is a strong horizontal disk 814 preferably affixed to shell 804 with machine screws. One or more holes 816 allow water to move freely there through. At the center of disk 814 is a preferably square hole that keeps the handle 812H of the two-pronged fork 812 from turning. It should be in the same plane as the arms 810, and 812 should only move vertically. If the bottom of the flat, two-pronged fork is pushed up through the square hole (obscured) in disk 814, it will raise the arms 810 along the path 806 until the arms 810 are pushed through the slots 828. If the tool 120*a* is lowered to the base 649 of the bottom funnel 70*b*, a "door latch" 818 will be pushed through the square hole and lock the arms inside the shell 804. This allows the tool 80 to be raised after the type-2 trap is deployed. A simple switch under the shell 806 resets the latch 818. Removing a type-2 funnel trap is a reversed process, but that simple switch is used to completely disable latch 818.

The individual components shown in outline or designated by blocks in the attached Drawings are all well-known in the plankton harvesting arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Biomass harvesting apparatus, comprising:
   at least one guide float adapted to float below a top surface of a body of water;
   at least one support structure adapted to be coupled to a body of water bottom beneath the body of water, and adapted to support a rigid frame within a dead zone below an oxygenated photic zone below the top surface in the body of water;
   a main funnel coupled to (i) the at least one guide float and (ii) the rigid frame within the dead zone, and adapted to collect descending biomass and funnel it toward a lower funnel that is coupled to the bottom of the main funnel;
   a collection canister is disposed adjacent the lower funnel and adapted to store the descending biomass; and
   hauling structure coupled to the guide float and adapted to haul the collection canister from the lower funnel to the surface through the neck of the lower funnel.

2. The apparatus according to claim 1, further comprising a guide tube coupled to the guide float and to the lower funnel, and adapted to guide the canister as it is hauled to the surface.

3. The apparatus according to claim 2, further comprising at least one debris shield coupled to the rigid frame and adapted to divert debris from entering the main funnel.

4. The apparatus according to claim 1, wherein the at least one support structure has a support plate structure at a top thereof and which is adapted to support a bottom of the lower funnel.

5. The apparatus according to claim 1, wherein the canister has at least one diverter window to divert biomass from the canister.

6. The apparatus according to claim 1, wherein the main funnel comprises a flexible lightweight sheet material.

7. The apparatus according to claim 1, wherein the at least one support structure includes a weight adapted to hold the at least one support structure to the body of water bottom beneath the body of water.

8. Biomass harvesting apparatus, comprising:
   at least one guide float adapted to float below a top surface of a body of water;
   at least one support structure adapted to be coupled to a body of water bottom beneath the body of water, and adapted to support a rigid frame within a dead zone below an oxygenated photic zone below the top surface in the body of water;
   a main funnel coupled to (i) the at least one guide float and (ii) the rigid frame within the dead zone, and adapted to collect descending biomass and funnel it toward a lower funnel that is coupled to the bottom of the main funnel;
   a collection canister is disposed adjacent the lower funnel and adapted to store the descending biomass; and
   hauling structure coupled to the guide float and adapted to haul the collection canister from the lower funnel,
   wherein the support plate structure has a ball joint structure adapted to keep the bottom of the lower funnel horizontal.

9. The apparatus according to claim 8, further comprising biasing structure adapted to impart vibrations to the main funnel.

10. Biomass harvesting apparatus, comprising:
    at least one guide float adapted to float beneath the top surface of a body of water;
    at least one vertical support coupled beneath the at least one guide float and adapted to extend downward into a dead zone below an oxygenated photic zone below the top surface of the body of water;
    a rigid frame coupled to the at least one vertical support in the dead zone;
    a main funnel coupled to the rigid frame in the dead zone and adapted to catch descending biomass;
    a lower funnel coupled to a bottom of the main funnel, and adapted to guide the biomass descending in the main funnel into a capture device;

bottom support structure affixed to a body of water bottom beneath the body of water and adapted to support the lower funnel; and hauling structure coupled to the at least one guide float and adapted to haul a collection canister from the lower funnel to the surface through the neck of the lower funnel.

11. The apparatus according to claim 10, wherein the main funnel comprises a flexible lightweight sheet material shaped as a funnel with a top open end oriented toward the surface.

12. The apparatus according to claim 10, wherein the rigid frame is adapted to be vibrated by raising and lowering the at least one vertical support.

13. The apparatus according to claim 10, wherein the rigid frame comprises a circular shape.

14. The apparatus according to claim 10, further comprising:
 a hold-down disc adapted to hold the guide float below the surface; and
 a guide tube coupled to the guide float and adapted to guide the capture device from the lower funnel to the guide float.

15. The apparatus according to claim 14, further comprising a debris shield coupled to the rigid structure and to the guide tube.

16. The apparatus according to claim 14, wherein the collection canister has at least one diverter window to divert the biomass from the collection canister.

17. The apparatus according to claim 10, further comprising a plurality of connectors coupled to the at least one guide float, and adapted to captured by a vessel disposed on the surface of the body of water.

18. Biomass harvesting apparatus, comprising:
 at least one guide float adapted to float beneath the top surface of a body of water;
 at least one vertical support coupled beneath the at least one guide float and adapted to extend downward into a dead zone below an oxygenated photic zone below the top surface of the body of water;
 a rigid frame coupled to the at least one vertical support in the dead zone;
 a main funnel coupled to the rigid frame in the dead zone and adapted to catch descending biomass;
 a lower funnel coupled to a bottom of the main funnel, and adapted to guide the biomass descending in the main funnel into a capture device;
 bottom support structure affixed to a body of water bottom beneath the body of water and adapted to support the lower funnel; and
 hauling structure coupled to the at least one guide float and adapted to haul a collection canister from the lower funnel to the surface,
 wherein the bottom support structure comprises a tripod having a horizontal plate structure at a top thereof.

19. The apparatus according to claim 18, wherein the horizontal plate structure includes a leveling structure adapted to support the bottom support structure in a horizontal position.

20. A method of harvesting biomass, comprising:
 deploying a guide float adapted to float below the top surface of a body of water;
 deploying a support line coupled below the guide float and extending downward into a dead zone below an oxygenated photic zone below the top surface of the body of water;
 deploying a rigid frame coupled to the support line;
 deploying a main funnel coupled to the rigid frame in the dead zone;
 harvesting descending biomass with the main funnel;
 guiding the descending biomass into a collection device in a lower funnel coupled to a bottom of the main funnel; and
 hauling the collection device to the surface to harvest the biomass through the neck of the lower funnel.

* * * * *